(12) United States Patent
Kamath et al.

(10) Patent No.: US 10,636,005 B2
(45) Date of Patent: Apr. 28, 2020

(54) METHOD AND SYSTEM FOR IMPLEMENTING AN ADAPTIVE DATA GOVERNANCE SYSTEM

(71) Applicant: ORACLE INTERNATIONAL CORPORATION, Redwood Shores, CA (US)

(72) Inventors: Rahul Ratnakar Kamath, Santa Clara, CA (US); Douglas Ray Cosby, Austin, TX (US); Matthew Lawrence Lontchar, Avon Lake, OH (US); Charles Randall Wilson, Dallas, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 927 days.

(21) Appl. No.: 14/862,883

(22) Filed: Sep. 23, 2015

(65) Prior Publication Data

US 2016/0092818 A1    Mar. 31, 2016

Related U.S. Application Data

(60) Provisional application No. 62/055,473, filed on Sep. 25, 2014.

(51) Int. Cl.
*G06Q 10/06* (2012.01)
*G06Q 10/00* (2012.01)

(52) U.S. Cl.
CPC ............................. *G06Q 10/06316* (2013.01)

(58) Field of Classification Search
CPC .......................... G06Q 10/06316; G06Q 10/00
USPC ........................................................ 705/7.26
See application file for complete search history.

(56) References Cited

U.S. PATENT DOCUMENTS

| | | | |
|---|---|---|---|
| 7,065,493 B1* | 6/2006 | Homsi | G06Q 10/06 705/7.26 |
| 8,543,436 B2* | 9/2013 | Bhatnagar | G06F 9/542 705/7.11 |
| 9,911,092 B2* | 3/2018 | Goja | G06Q 10/06 |
| 2002/0062240 A1* | 5/2002 | Morinville | G06F 21/604 707/792 |
| 2003/0036934 A1* | 2/2003 | Ouchi | G06Q 10/06311 705/7.13 |
| 2005/0256818 A1* | 11/2005 | Sun | G06Q 10/06316 705/301 |

(Continued)

OTHER PUBLICATIONS

Arturo Gonz'alez-Ferrer, Juan Fern'andez-Olivares, Luis Castillo. From Business Process Models to Hierarchical Task Network Planning Domains. The Knowledge Engineering Review, vol. 00:0, 1-24. c 2010, Cambridge University Press. DOI: 10.1017/S000000000000000 Printed in the United Kingdom. (Year: 2010).*

(Continued)

*Primary Examiner* — Hafiz A Kassim
*Assistant Examiner* — Abdallah A El-Hage Hassan
(74) *Attorney, Agent, or Firm* — Vista IP Law Group, LLP

(57) ABSTRACT

Disclosed is a method, system, and computer program product for implementing adaptive business workflows, where the context is coordinated with a hierarchy. The adaptive workflow may include conditional stages that are also coordinated with the hierarchy.

21 Claims, 19 Drawing Sheets

(56) References Cited

U.S. PATENT DOCUMENTS

| | | | | |
|---|---|---|---|---|
| 2009/0182607 | A1* | 7/2009 | Morinville | G06Q 10/06 |
| | | | | 705/7.14 |
| 2013/0080478 | A1* | 3/2013 | Ben-Haim | G06Q 10/067 |
| | | | | 707/802 |
| 2014/0067457 | A1* | 3/2014 | Nagendra | G06Q 10/06 |
| | | | | 705/7.27 |
| 2014/0297354 | A1* | 10/2014 | Kogiso | G06Q 10/06316 |
| | | | | 705/7.26 |
| 2014/0330616 | A1* | 11/2014 | Lyras | G06Q 10/0635 |
| | | | | 705/7.28 |

OTHER PUBLICATIONS

P.W.H Chung a, L Cheung a, J Stader b, P Jarvis b, J Moore a, A Macintosh b. Knowledge-based process management—an approach to handling adaptive workflow Science Direct, Knowledge-Based Systems, vol. 16, Issue 3, Apr. 2003, pp. 149-160. (Year: 2003).*
Dongsheng Liu a, Jianmin Wang a, Stephen C.F. Chan b, Jiaguang Sun a, Li Zhang. Modeling workflow processes with colored Petri nets. Science Direct, Computers in Industry, vol. 49, Issue 3, Dec. 2002, pp. 267-281. (Year: 2002).*

* cited by examiner

Workflow Model 1204 = Model Filters 1206 + Workflow Stages 1208 + Workflow Tasks 1210 + Workflow Node Hierarchy Groups 1212

| * Name | New Financial Account | | | | |
| Label | New Financial Account | | | | |
| Description | Define a new financial account for general ledger accounting | | | | |

Request Duration: 5 days
Claim Duration: 1 days

| Label | Stage | Workflow Task | Node Access | | |
|---|---|---|---|---|---|
| Define Financial Account | Submit | Add Financial Account | Custom, NewAccountAccess | | |
| Update Financial Account | Enrich | Update Financial Account | Custom, ConsultWorkflow | | |
| Commit Financial Account | Commit | Commit Financial Account | Custom, COAApprovalWorkflow | | |

| | | Workflow Method | Re-Approved | Notify | Action |
|---|---|---|---|---|---|
| | | Any Group | All | None | |
| | | Any Group | All | None | |

Workflow Stages 1202

Fig. 12A

METHOD AND SYSTEM FOR IMPLEMENTING AN ADAPTIVE DATA GOVERNANCE SYSTEM

CROSS-REFERENCE TO RELATED APPLICATIONS

The present application claims the benefit of priority to U.S. Provisional Application No. 62/055,473, filed on Sep. 25, 2014, which is hereby incorporated by reference in its entirety.

BACKGROUND

The present invention relates to the field of business process management, and, in particular, to a system and method for executing a business process workflow.

A business process management (BPM) engine, or workflow engine, can be used to design and implement business execution actions. As just one example, a data governance system provides a tool that uses workflows to handle the implementation of business processes. Specific stages can be designed into the workflow to address and implement approval processes for the business.

In such systems to handle business approvals, it is possible that different approval paths may need to be implemented based upon differences within the organizational structure of the business. Conventionally, this situation is handled by implementing a separately designed workflow (or workflow portion) for each and every organizational variant that requires different approval processing for the organization. For example, requests to introduce a new product of a first type may require the approvals of certain managers A and B, requiring a workflow for these types of requests to be designed that specifically includes approval processing stages for these managers. Meanwhile, requests to introduce a new product of a second type may require the approvals of other managers C and D, requiring an entirely different workflow for these types of requests to be designed that specifically includes approval processing stages for these other managers. Even though these two processing flows are either very similar or identical, the differences in the specific organizational entities required for approvals would necessitate different workflows to be created.

In a very large organization, this problem is magnified by the sheer number of possibly redundant workflows that would need to be created to handle approval processes for the business. The inefficiencies are further increased by the fact that organizational hierarchies do not remain static, but often change due to movements of people and departments as a result of personnel changes and business reorganizations—which may require wholesale creation or editing of even more workflows.

Accordingly, there remains a need to address the drawbacks and limitations discussed above with regards to the standard approaches to implement business workflows.

SUMMARY

Embodiments of the invention provide a method, system, and computer program product for implementing contextual business workflows, where the context is coordinated with a hierarchy. This allows the workflow to be executed in an adaptive manner, by referencing the data in the hierarchy and/or changes in the hierarchy. The contextual workflow may include conditional stages that are also coordinated with the hierarchy. The hierarchy can be stored and/or managed by any system pertaining to the workflow system. In some embodiments, the hierarchy is managed by the same system that implements the workflows.

According to some embodiments, described is an adaptive data governance system, where the execution of the stages and approvals in a workflow is contextually based upon the data being changed and where the data resides in a multi-structure hierarchy model. The stages and approvals of a data governance workflow are derived based upon how the requested changes align with the multiple hierarchies affected by these changes. The contextual workflow in the data governance system may include conditional stages that are also coordinated with the hierarchy. This greatly reduces the amount of effort required to maintain the various workflows needed to support data governance by allowing a single adaptive workflow model to support multiple data contexts.

Other additional objects, features, and advantages of the invention are described in the detailed description, figures, and claims.

BRIEF DESCRIPTION OF FIGURES

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 12A-C illustrates an example user interface for configuring a workflow.

DETAILED DESCRIPTION

Embodiments of the invention provide a method, system, and computer program product for implementing adaptive workflows (e.g., business workflows), where the context is coordinated with a hierarchy model. The contextual workflow may include conditional stages that are also coordinated with the hierarchy.

To illustrate the invention, embodiments are described below in the context of a data governance system, where the execution of stages and approvals in a workflow is contextually based upon the data being changed and where the data resides in a multi-structure hierarchy model. The stages and approvals of a data governance workflow are derived based upon how the requested changes align with the multiple hierarchies affected by these changes. This invention greatly reduces the amount of effort required to maintain the various workflows needed to support data governance by allowing a single conditional workflow model to support multiple data contexts.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments", in various places throughout this specification are not necessarily referring to the same embodiment.

In addition, while the invention is illustratively described in the context of a data governance system, it is noted that the invention is applicable to any system that implements workflows. For example, the inventive concepts disclosed herein may be applicable to workflows pertaining to marketing campaigns, compensation calculation models, and supply chain management. Therefore, the invention is not to be limited only to data governance systems unless explicitly claimed as such.

Figure 1:
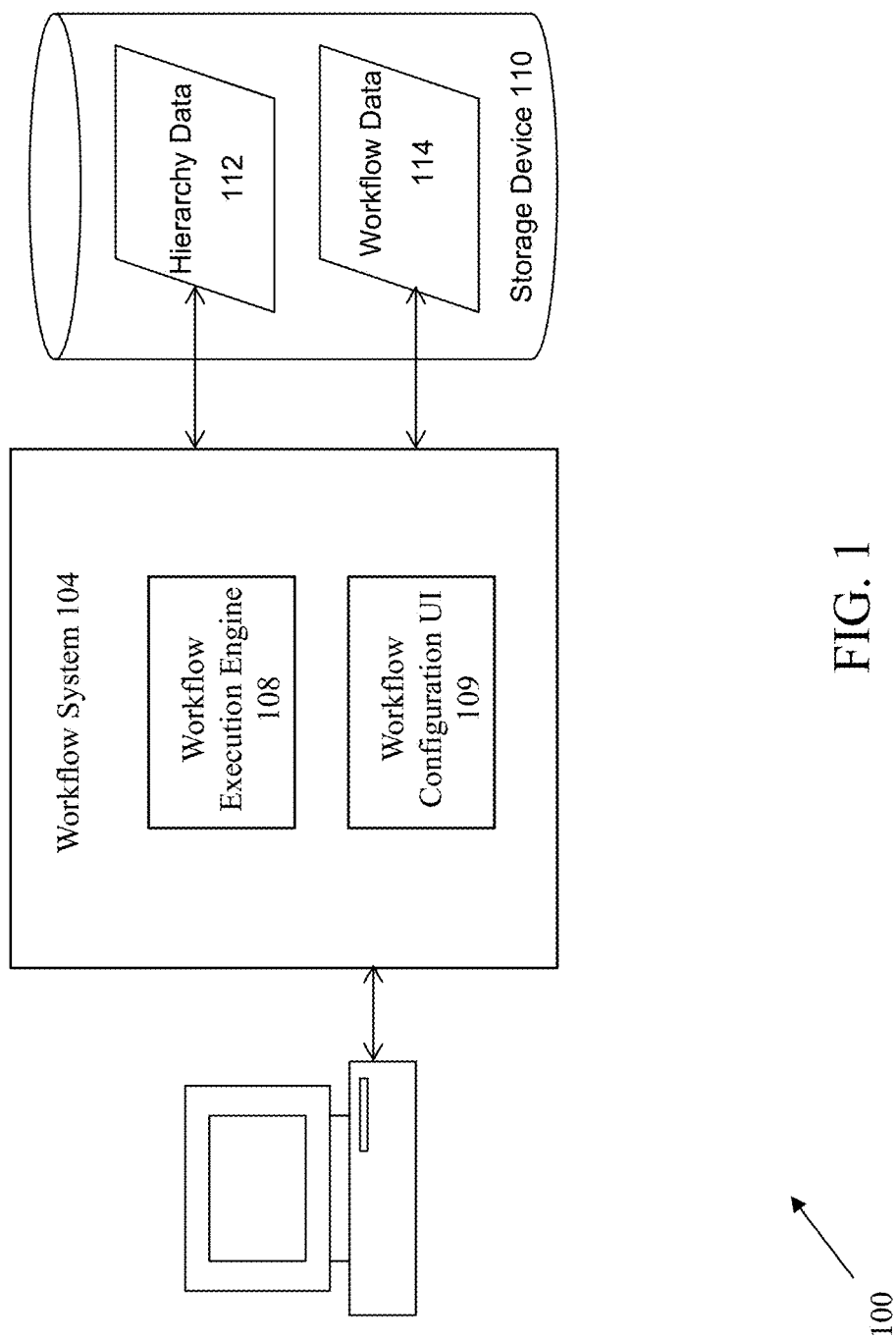
FIG. 1 illustrates an example system which may be employed in some embodiments of the invention.

FIG. 1 illustrates an example system 100 which can be employed in some embodiments of the invention to provide an approach for implementing adaptive workflows. The system 100 includes one or more users at one or more user stations that use the system 100 to operate and interact with the workflow system 104. The user station comprises any type of computing station that may be used to operate or interface with the workflow system 104 in the system 100. Examples of such user stations include, for example, workstations, personal computers, mobile computing devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs.

The workflow system 104 comprises functionality that is accessible to users at the user stations, e.g., where workflow system 104 is implemented as a set of engines or modules to perform workflow analysis or workflow configuration. In some embodiments, the workflow system 104 comprises a workflow configuration user interface (UI) 109 to configure workflows and a workflow execution engine 108 to execute the configured workflows.

The workflow configuration UI 109 generates the interface that is used to configure the business workflows. Example user interfaces are described in further detail below in conjunction with FIGS. 12A, 12B, and 12C.

Embodiments of the invention pertain to adaptive workflows that can reference a hierarchy to obtain context data for executing the workflow. One approach that can be taken to enhance the adaptive nature of the contextual workflow is to include conditionality into the workflow.

One of the virtues of conditionality is that it can make data governance workflows more effective at addressing data quality issues by putting the request items through a data remediation process. This augments the value of the workflow beyond the traditional change request approval workflow. For instance, a data steward may run a batch validation job to identify a list of records with quality issues. One can then add these items to a request (based upon a workflow model with conditional stages) to parse a subset of this set by each validation and redirect that subset to the appropriate user group. Accordingly, those items that have the least amount of issues would skip through stages where they pass validation (conditional) logic and only enter a stage that is contextually relevant. Moreover, the users presented with the issues are those closest to the issue addressed by the validation logic associated with the said stage.

Some embodiments of the invention provide for inclusion of conditional stages into a workflow. Conditional stages pertain to stages where the specific actions to be taken are not fixed ahead of time, but are instead decided based upon some state that is to be identified or determined at the time of processing the workflow. The interface described in FIG. 12A can be used to include conditional stages into the workflow.

In the current embodiment, some or all of the conditional stages in the workflow can be configured to be dependent upon the content of a hierarchy model 112. For example, consider a workflow to approve a new product in an organization, where product approvals may undergo one of two alternative approval paths depending upon whether the product falls within a first department or a second department in the company. The hierarchy model 112 maintains a set of hierarchy data that tracks from an organizational perspective the products/people or products/role (e.g., for role based approvals) in the organization, and maps those products/people or products/role to designated locations within the hierarchy. As such, the hierarchy model provides a set of data that can provide a context for the execution of the workflow. By consulting the hierarchy model 112, the conditional stage of the workflow can automatically determine whether a given product that needs approval falls within the first department or the second department, thereby automatically selecting the appropriate approval path for that product.

This approach is quite advantageous since the single workflow can be configured to handle multiple possible conditions, where the context for the conditions is determined by consulting hierarchy data for the organization. This is in sharp contrast to alternative approaches that may require multiple dedicated workflows to address all of the different workflow possibilities that pertain to the different organization structures and hierarchies in the business.

This approach is also beneficial in that the workflow can automatically account for any organization changes that occur within an organization. It is a fact of life in many organizations that personnel will leave or change jobs, and that re-organizations will occur to change the way that departments and groups are structured in the business. With the current embodiments of the invention, a workflow may not need to be amended after such organizational changes since the workflow only needs to consult the new organizational data to work properly. In contrast, with prior art alternative approaches, each of these organizational changes may potentially require every affected workflow to be edited, and for significant organizational changes, may even require entirely new workflows to be created.

Any type of conditional processing may be performed by the conditional stage in the workflow. For example, branching may be performed to call or start different workflow models for execution. In addition, workflow splitting may occur, to implement multiple alternative paths within a workflow. In some embodiments, conditional workflows and splits do not call or start different workflow models. In some additional embodiments, conditionality is implemented in a single model by skipping steps, and splitting splits the request into two requests, both of the same model.

In some embodiments, the hierarchy model 112 may be referred to as an external hierarchy. It is noted that the hierarchy model can be stored and/or managed by any system pertaining to the workflow system, whether internal or external. The term "external" merely refers to the idea that the data for the hierarchy model does not need to be persistently and statically embedded within the workflow itself. In some embodiments, the hierarchy model is managed in a data relationship management application, as part of a business data hierarchy of the data that is being managed by the workflow—and not necessarily in a separate "approval" hierarchy.

For example, without the present approach, a system that manages a business hierarchy using workflow would either (1) require individual workflows to be built for each different section of business data that required different approvals (by using a multi-workflow model approach); or (2) manage a second approval hierarchy that is mapped to the business hierarchy and is used to determine who is required for approval at different points in the business hierarchy. With the present approach, a business hierarchy itself can serve as the determinant of the approvers, so that the business data has the approvers effectively built into it. In this example scenario, the hierarchy forms an "Approver Enriched" business hierarchy.

In FIG. 1, the workflow configuration UI 109 may also include a portion to select and configure filters within the workflow model 114. These filters can be used, for example, to specify which hierarchies or hierarchical portions can be modified by the workflow. For example, filtering may be applied to restrict the workflow to only "current" products, "planned/future" products, or a combination of both types of products.

A workflow execution engine 108 performs operations to execute the business workflows 114. As noted above, the workflow 114 may include workflow stages, such as conditional workflow stages, that are referentially tied to a hierarchy model 112. Therefore, execution of the workflow 114 by the workflow execution engine 108 may involve system calls to access the hierarchy model 112.

Various approaches may be taken to represent the hierarchy data and/or workflow data in the storage device 110. In some embodiments, these are represented as database objects. For example, the different stages of the workflow can be represented as linked objects, having parameters associated with the workflow stage, such as type of stage, actions associated with the stage, conditions, relationship with other workflow stages, etc. The nodes in the hierarchy model may be represented as entries in a database table, where one or more columns of the table hold relationship data for the nodes, e.g., to store information about parent-child relationships. The database entry also includes one or more columns that store parameter data for the node. When a hierarchy is updated, one or more entries are updated, added, or removed from the table associated with the hierarchy. Referential linkages may be imposed between the workflow data and the hierarchy data that are either/both internal to these database objects as well as external to these objects. For example, for an internal referencing approach, the objects that hold the workflow data and/or the hierarchy data may include a field that provides for direct referencing between the two sets of data, e.g., where the workflow stage points to some or all of the hierarchy data. For an external referencing approach, an external data structure provides the referencing information to tie these two sets of data together.

The data in the system 100, such as hierarchy model 112 and workflow model 114, may be held or stored in a computer readable storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects and/or files in a file system. The hierarchy model 112 can be received from any suitable platform for generating and maintaining hierarchy data. One example product that is usable in embodiments of the invention to generate and maintain hierarchy models is the Data Relationship Management product available from Oracle Corporation of Redwood Shores, Calif.

Figure 2A:
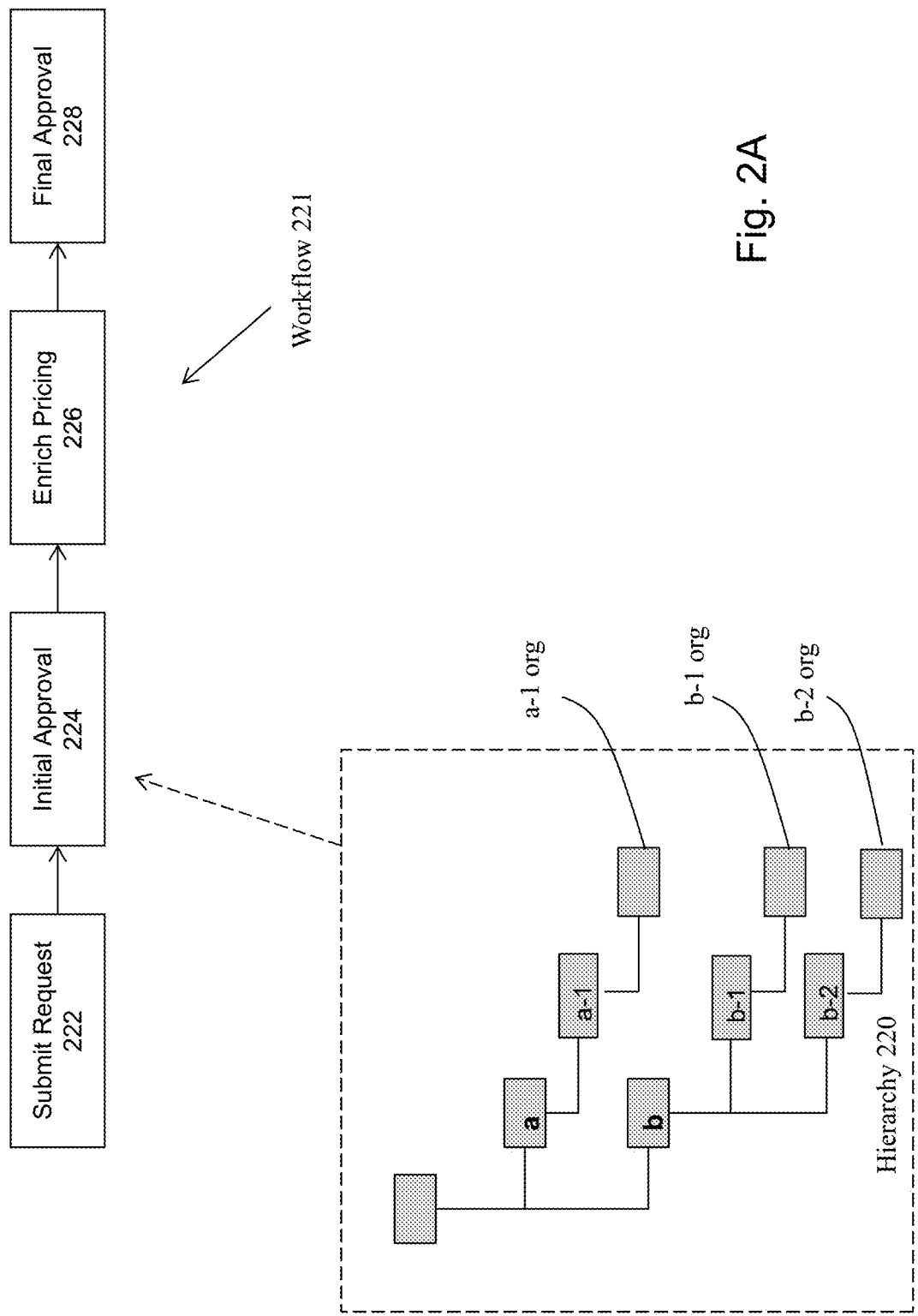
FIGS. 2A-C illustrate embodiments of the invention in the data governance scenario.

FIG. 2A illustrates how a hierarchy model can be consulted to process a workflow in a data governance system. A workflow 221 has been configured (e.g., to obtain product approvals in a business) that includes multiple workflow stages. Workflow stage 222 pertains to tasks that need to be taken to submit a request with regards to the product. Workflow stage 224 pertains to the tasks to obtain initial approval of the request. An additional stage at 226 may pertain to actions to enrich pricing for the product. A last stage 228 may exist for obtaining final approval.

The initial approval stage 224 may be configured to have a relationship with the hierarchy model 220, such that identification of specific approvers necessary for the workflow stage 224 is obtained by checking the hierarchy model 220. For example, if the workflow pertains to product a-1, then the hierarchy model 220 is walked to identify the specific approvers that would be necessary to grant initial approval for this product. This involves identifying the specific personnel associated with necessary approvals for the a-1 product, and possibly other managers upwards at higher levels in the hierarchy. Similarly, if the workflow pertains to product b-1, then the hierarchy model 220 is walked to identify the specific approvers that would be necessary to grant initial approval for this b-1 product.

Here, a single workflow is established that can be used for all of the different product types, where the list of approvers for any given stage may be identified merely by consulting the relevant portion(s) of the related hierarch(ies). This is in sharp contrast to alternative approaches that may require a separate workflow to be constructed for the approval processing for each different product, where the list of approvers is hardcoded into the workflow.

Figure 2B:
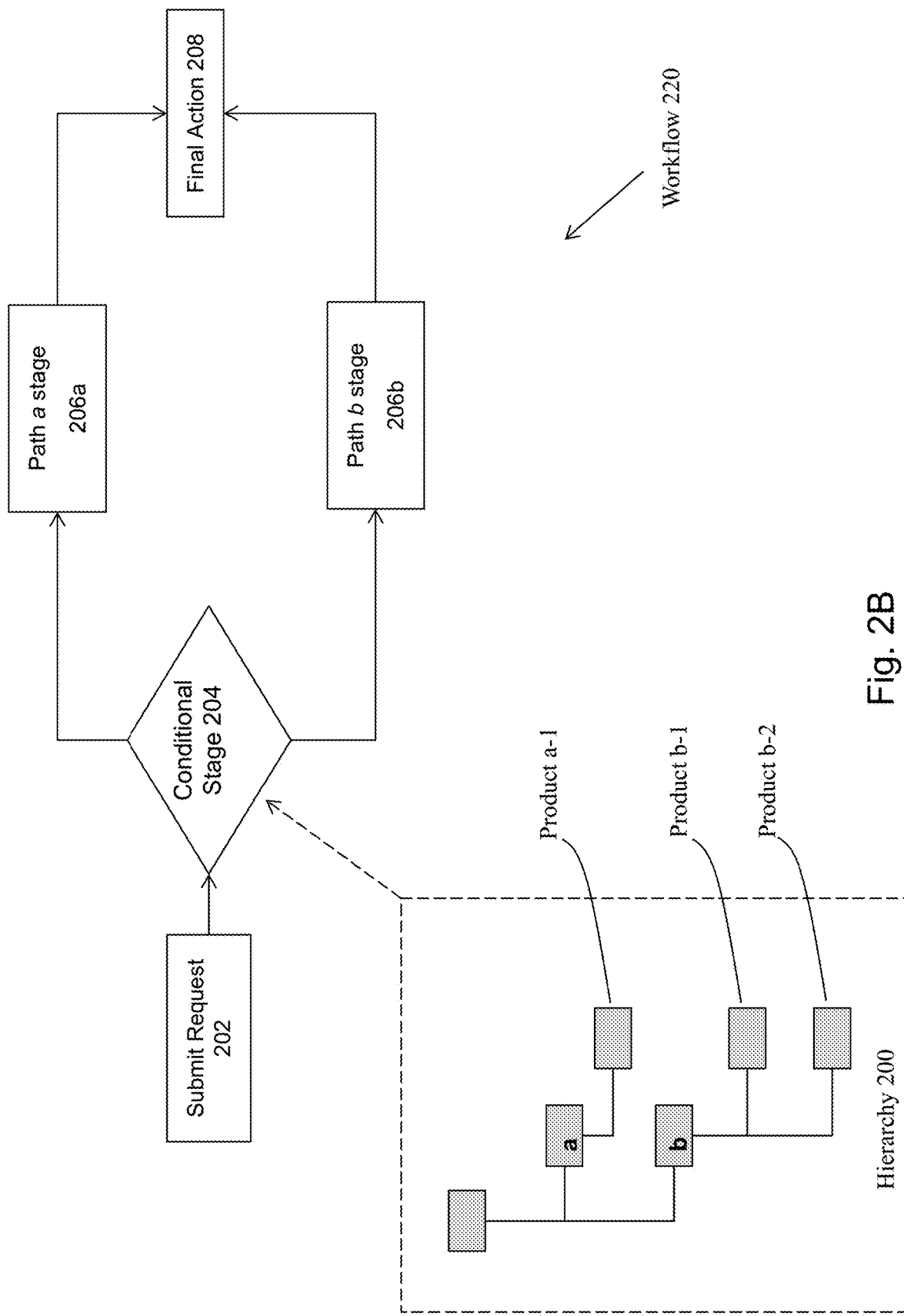

FIG. 2B illustrates an embodiment of the invention in the data governance scenario that includes a conditional stage to implement branching. A workflow 220 has been configured (e.g., to obtain product approvals in a business) that includes multiple workflow stages. Workflow stage 202 pertains to tasks that need to be taken to submit a request with regards to the product. A conditional stage 204 exists, where the conditional stage 204 may send further workflow processing along one of two paths. For type a products, the conditional stage 204 will cause processing of the workflow to follow the path to the path a stage 206a. For type b products, the conditional stage 204 will cause processing of the workflow to follow the path to the path b stage 206b. Both paths converge to execute the final stage 208.

In this example, the conditional stage 204 operates by referencing a hierarchy model 200, where the processing of the workflow is dependent upon the location of the product within the hierarchy. Here, if the request is being submitted relates to product a-1, then it can be seen that this product is within the a hierarchy, and hence workflow processing will occur through the path that includes the path a task 206a. However, if the request is being submitted relates to either product b-1 or b-2, then it can be seen that this product is within the b hierarchy, and hence workflow processing will occur through the path that includes the path b task 206b.

Figure 2C:
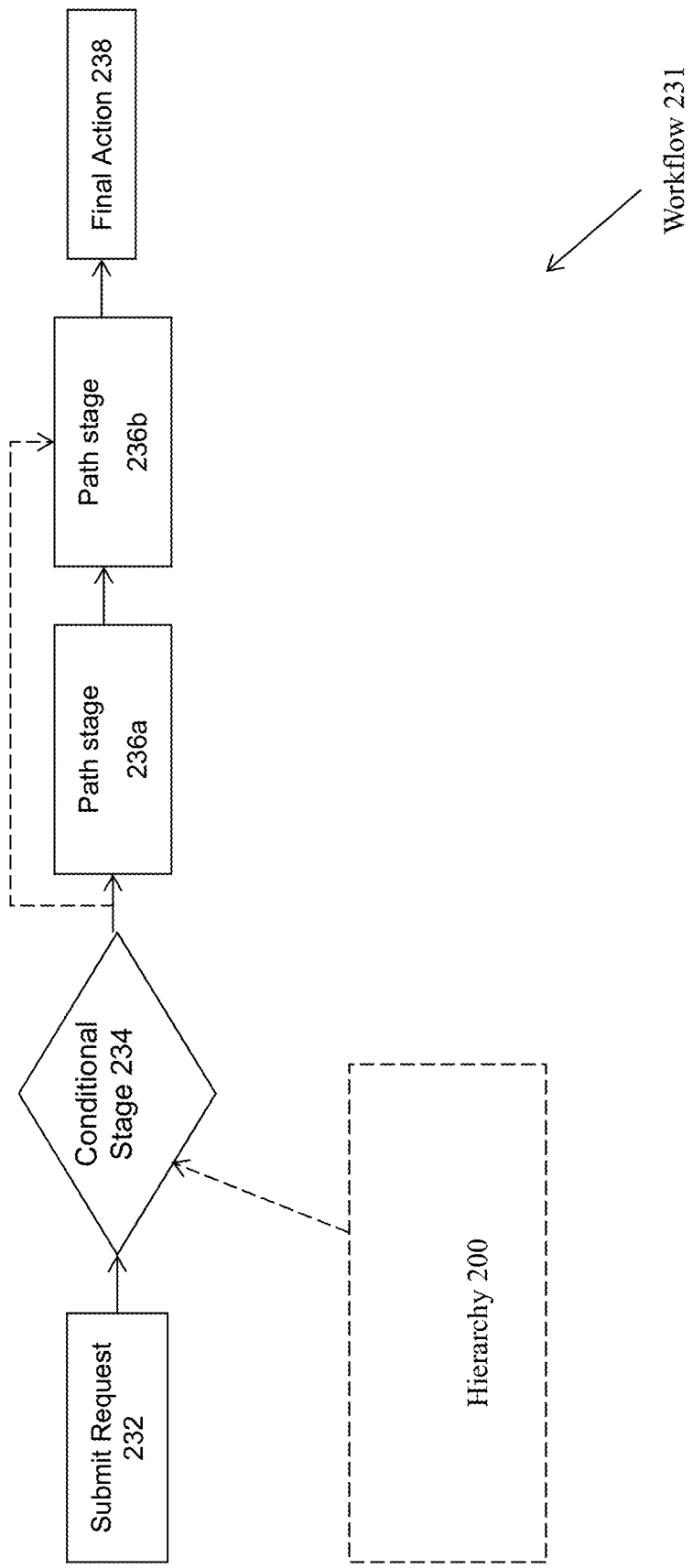

FIG. 2C shows an alternate approach to implement a conditional stage, where branching is achieved by skipping one or more one or more workflow stages. A workflow 231 has been configured (e.g., to obtain product approvals in a business) that includes multiple workflow stages. Workflow stage 232 pertains to tasks that need to be taken to submit a request with regards to the product. A conditional stage 234 exists, where the conditional stage 234 may check against hierarchy 200 to send further workflow processing along one of two paths.

For a first path, the conditional stage 234 will cause processing of the workflow to follow the path that includes both stage 236a and stage 236b. For a second path, the conditional stage 234 will cause processing of the workflow to follow another path that skips stage 236a, but proceeds directly through stage 236b. Both paths converge to execute the final stage 238.

The adaptive/conditional processing may be performed according to any attribute of an object within the hierarchy, and is not limited only to looking at the hierarchical positioning of an object in the hierarchy. For example, objects in the hierarchy may include inheritable attributes that flow from root or intermediate nodes in the hierarchy. These inherited attributes may also form the basis for decisions to be made by the adaptive/conditional stages.

Figure 3:
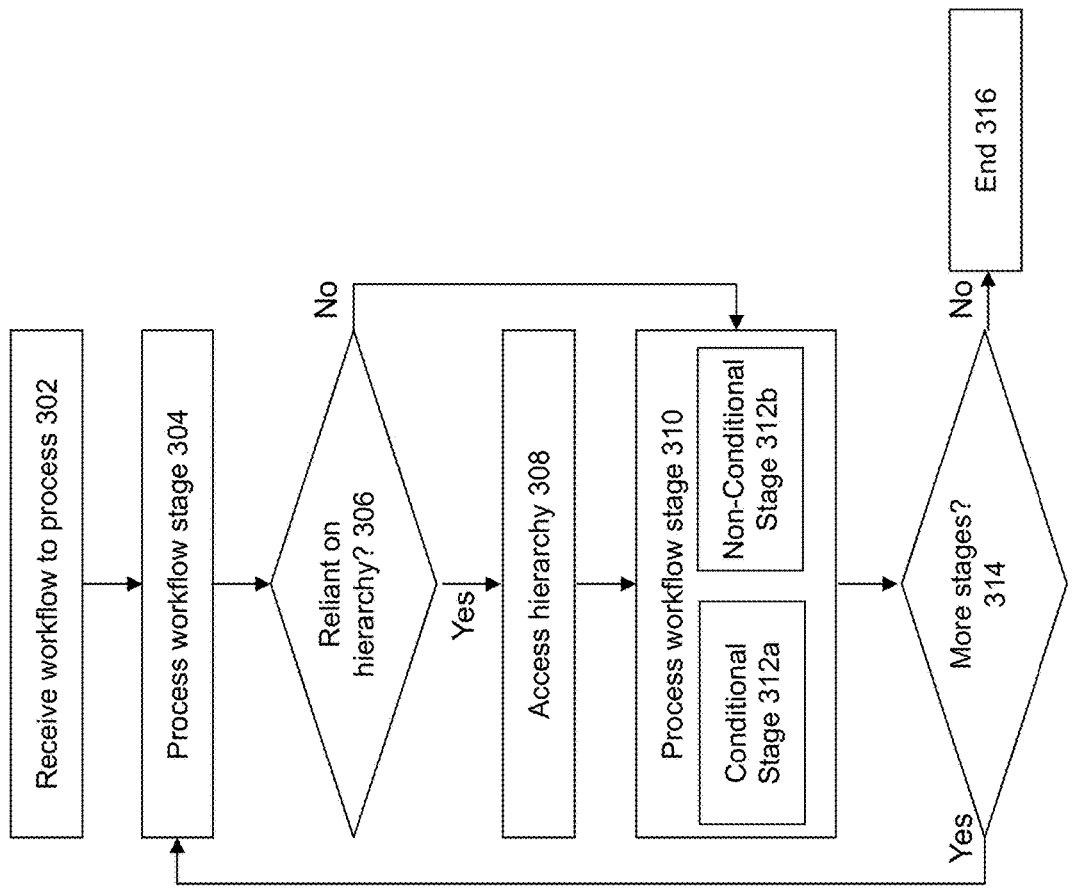
FIG. 3 shows a flowchart of an approach to implement some embodiments of the invention.

FIG. 3 shows a flowchart of an approach to implement some embodiments of the invention. At 302, a workflow is received for processing. The workflow is configured to include one or more workflow stages having workflow tasks. The workflow may be configured using a user interface, having interface features as shown, for example, in FIGS. 6A-C. The workflow may be represented using any appropriate data structure, e.g., with database objects.

At 304, a workflow stage is selected for processing. In some embodiments, the data object associated with the particular workflow stage is identified in this action. A determination is made at 306 whether the workflow stage is reliant upon a hierarchy model. This may be performed, for example, by determining if there is a referential linkage between the workflow object and some or all of the hierarchy data. If not, then the process directly proceeds to 310 to process the workflow stage and to perform the specified workflow tasks.

However, if the workflow stage is reliant upon a hierarchy model, then that hierarchy model is accessed at 308. At 310, that workflow stage is then processed with consideration of the content within the hierarchy model. In the case of a conditional stage 312a, the stage is processed to identify whether the hierarchy data requires a conditional action to be taken by the workflow.

Even for a non-conditional stage 312b, the hierarchy model may be accessed to process the stage. For example, a non-conditional stage 312b may pertain to an approval stage, where the specific approver for the stage is not hard-coded into the workflow. Instead, the specific approver(s) for the stage is determined by accessing the hierarchy model, e.g., to identify the set of managers that pertain the portion of the organization hierarchy that contain the product subject to the workflow approval stage.

A determination is then made at 314 whether there are any further workflow stages to process. If so, the process returns back to 304 to select another stage for processing. If not, the workflow processing ends at 316.

In many cases, execution of the workflow by consulting the hierarchy model may cause changes to the hierarchy model. In other words, the workflow may affect or change the very hierarchy that it is dependent upon for its processing.

Figure 4A:
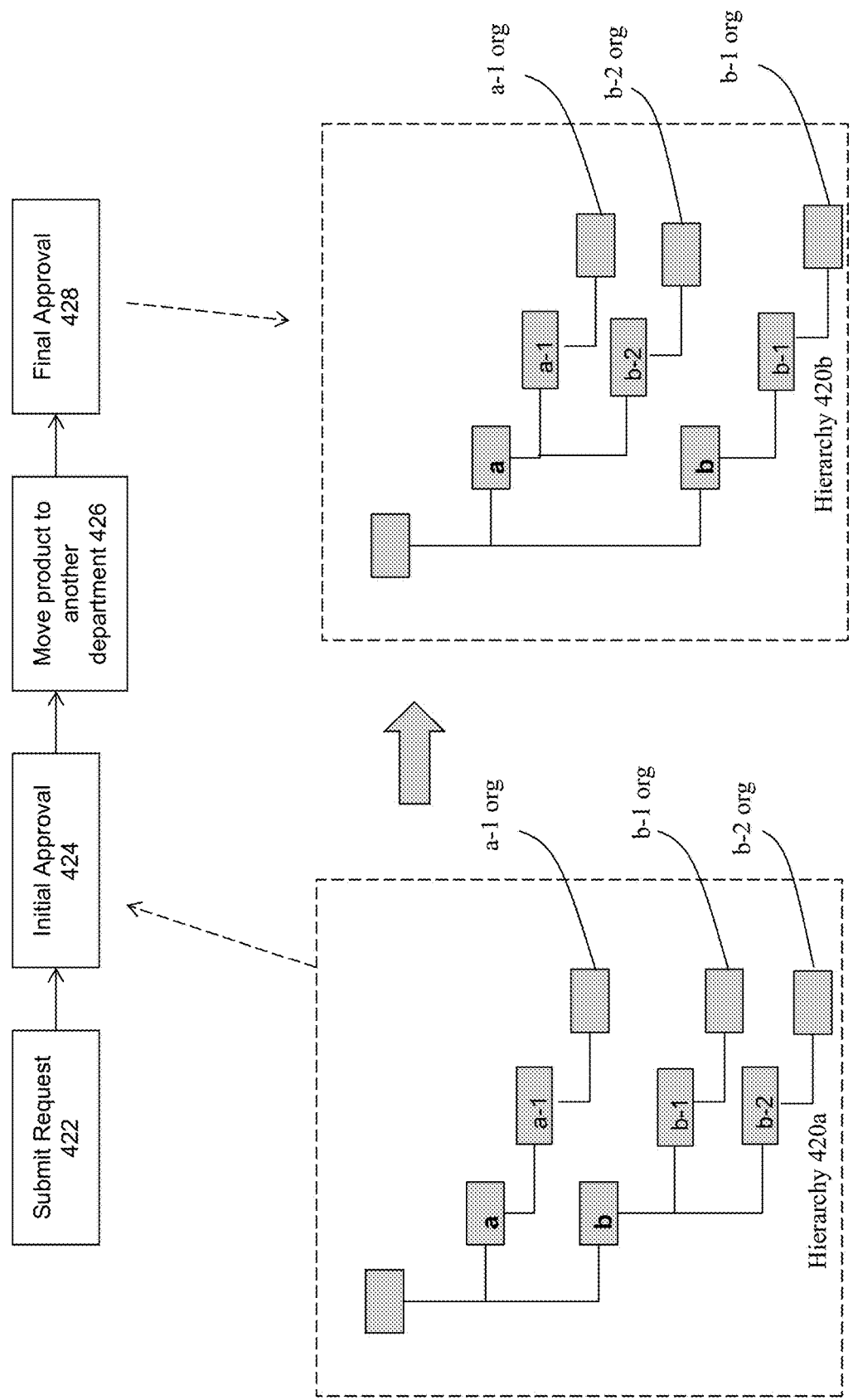
FIGS. 4A-B illustrate some embodiments of the invention pertaining to changes to the hierarchy model.

FIG. 4A illustrates an example of this scenario in a data governance context. A workflow 421 has been configured that includes multiple workflow stages, where one aspect of the workflow relates to moving a product from one department to another (e.g., moving a product from the HW group to the SW group). Workflow stage 422 pertains to submission of a request with regards to the product. Workflow stage 424 pertains to the tasks to obtain initial approval of the request. An additional stage at 426 may pertain to actions to move the product from one group to another group. A last stage 428 may exist for obtaining final approval.

The approval stages 424/428 may be configured to have a relationship with the hierarchy model 420a, such that identification of specific approvers necessary for these workflow stages are obtained by checking the hierarchy model 420a. For example, assume that the workflow pertains to a request to move product b-2 from group "b" to group "a". To obtain the required approvals for stages 424 and 428, the hierarchy model 420a is walked to identify the specific approvers that would be necessary to grant approval for this movement of the b-2 product.

Assuming all of the initial and final approvers have given their approval for the appropriate tasks/stages in the workflow, then execution of the workflow will cause the desired business process to be implemented. In this case, this results in the product b-2 being moved from the "b" group to the "a" group. The hierarchy model is modified as shown in 420b to reflect this change. It can be seen that the information for b-2 is now moved in the hierarchy from the "b" portion of the hierarchy to the "a" portion of the hierarchy.

The next time this workflow (or any other workflow) is executed with respect to product b-2, the hierarchy 420b is consulted to identify the set of approvers that are needed to approve a workflow involving the b-2 product. Since the b-2 product is now under the "a" portion of the hierarchy, an entirely different set of approvers may now need to give approval for the workflow. This demonstrates that the previous execution of the workflow has self-modified/selfupdated the very hierarchy that it is dependent upon for its processing, so that the next execution of the workflow may in essence operate differently even if directed to the same product/subject matter.

Figure 4B:
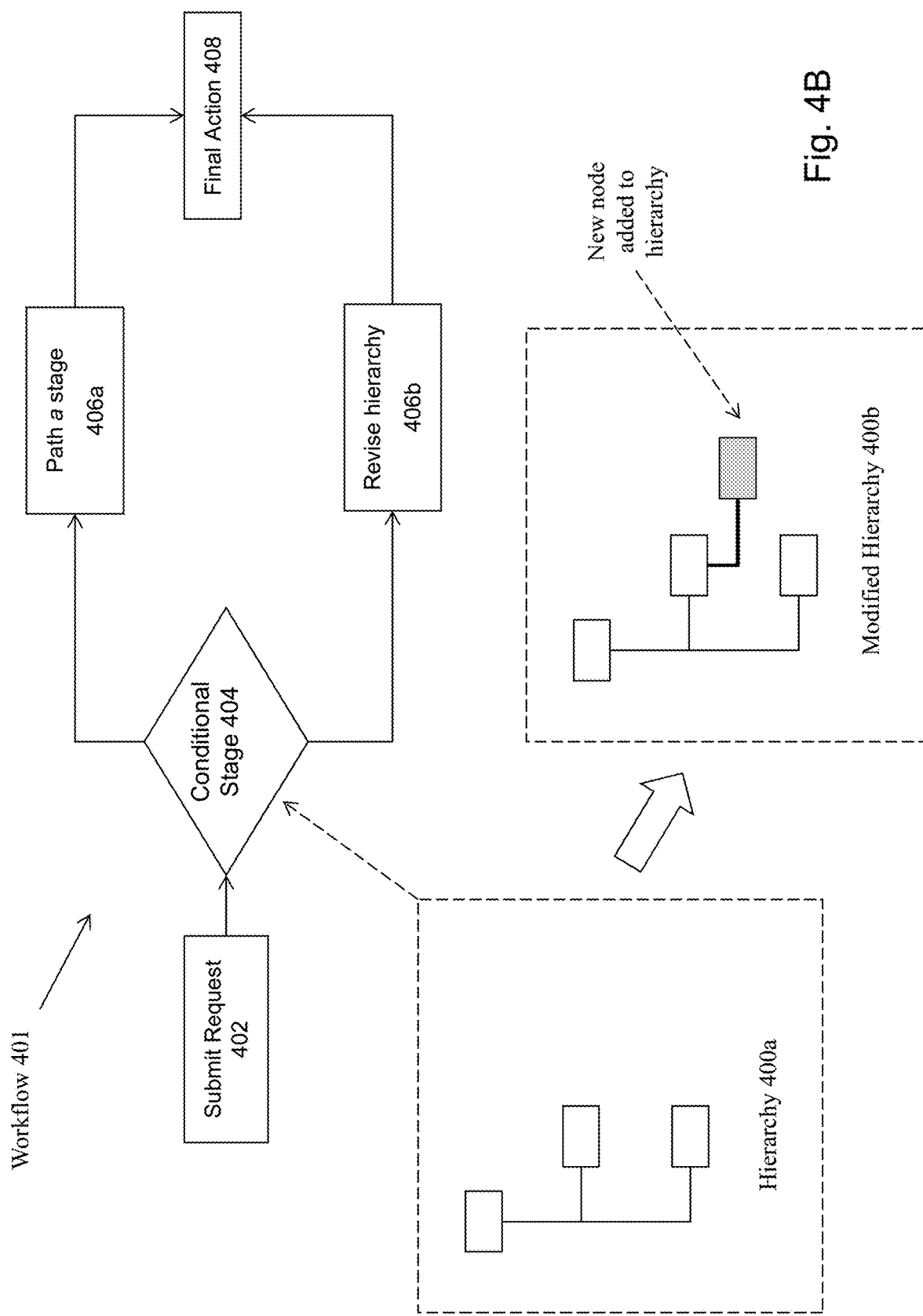

FIG. 4B illustrates this aspect of some embodiments of the invention where the workflow includes a conditional stage. Here, a workflow 401 has been configured that includes multiple workflow stages, where workflow stage 402 pertains to tasks that need to be taken to submit a request with regards to a product within hierarchy 400*a*. A conditional stage 404 exists in the workflow 401, where the conditional stage 404 may send further workflow processing along one of two paths. For certain product types, the conditional stage 404 will cause processing of the workflow to follow the path to the path a stage 406*a*. For other types of products, the conditional stage 404 will cause processing of the workflow to follow the path to the stage 406*b*. Both paths converge to execute the final stage 408.

As before, the conditional stage 404 operates by referencing a hierarchy model 400*a*, where the processing of the workflow is dependent upon the location of the product within the hierarchy. However, here, the conditional stage may cause processing at stage 406*b* to revise the hierarchy. For example, this stage may cause a new product to be approved and then added as a new node within the hierarchy. The revised hierarchy 400*b* is illustrated as shown to include a new node.

A similar approach can be taken with regards to conditional workflows that implement branching by skipping one or more stages, such as the workflow shown in FIG. 2B. The conditional stage may cause processing at one or more stages to revise the very hierarchy that is relied upon by the workflow.

Figure 5:
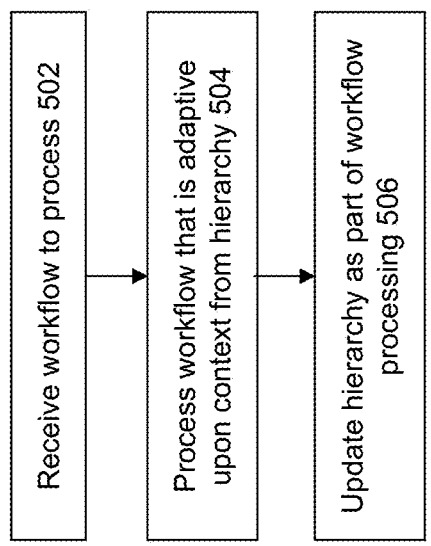
FIG. 5 shows a flowchart of an approach to implement some embodiments of the invention pertaining to changes to the hierarchy model.

FIG. 5 shows a flowchart of this approach according to some embodiments. At 502, a workflow is received for processing. The workflow is configured to include one or more workflow stages having workflow tasks, where at least one of the stages pertains to an adaptive/conditional stage that is reliant upon a hierarchy model.

At 504, the adaptive/conditional stage is processed by accessing the hierarchy model. The stage is then processed with consideration of the content within the hierarchy model, where any aspect or attribute of the objects in the model provide state information for resolving any adaptive actions or conditions within the conditional stage. For example, either the location or attribute of a given node in the hierarchy may be used to resolve any conditions in the conditional stage.

The workflow processing may involve tasks and actions that will cause a change to the underlying hierarchy model. For example, the workflow may pertain to the approval process to introduce a new product. Processing of the workflow may cause a new product or product family to be included into the hierarchy model, or an existing product or family to be moved within the hierarchy. Therefore, at 506, the hierarchy model is updated to reflect the changes caused by execution of the workflow.

As noted above, the workflow model can be configured to evaluate property or validation criteria for request items in requests and to perform a conditional action based on the results of the evaluation. The workflow models are organized in a series of stages which control the tasks to be performed for specific governance requests and to which users can participate. The workflow models include stages configured with workflow tasks to submit, approve, enrich, and commit governance requests.

In some workflows, requests submitted for a particular workflow model may be required to go through all configured stages of that model. However, in business practice, there is often the need to handle data variations and exceptions which may require more/fewer workflow tasks to be performed and/or more/fewer users to approve a particular governance request.

Consider if administrator of the system needs the ability to configure a workflow model to conditionally alter the workflow path for individual requests to ensure that the proper workflow tasks are performed and the necessary approval groups can provide approval. In this scenario in some embodiments, altering the workflow path includes: (a) conditionally including particular workflow stages depending on whether request items have certain property values or fail certain validations; and (b) conditionally separating request items which require different approvers or enrichment tasks into different requests to follow separate workflow paths. Once the administrator has configured the workflow model(s), submitted requests can proceed through different workflow stages by evaluating properties and validations configured for particular workflow stages of the model.

The stage criteria can be configured for a workflow stage to evaluate property values and/or validations for request items before a request is assigned to the stage. If any request items meet the stage criteria for the stage, the request performs the conditional action specified for the stage. If there are no items which meet the stage criteria, the workflow stage is skipped and the request proceeds to the next stage in the workflow path.

Figure 6:
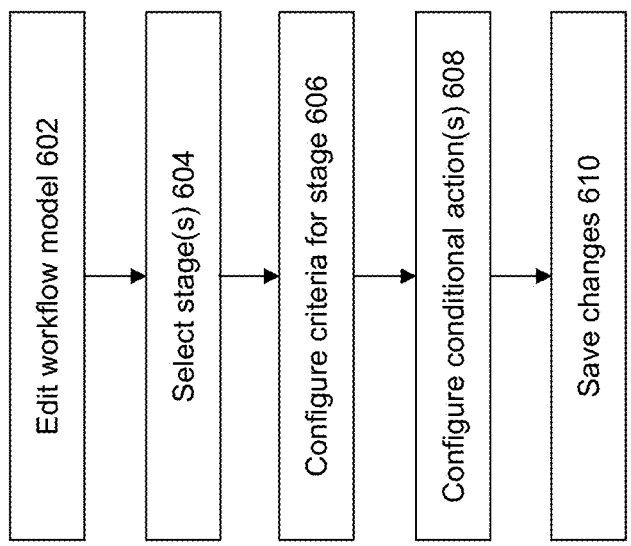
FIG. 6 illustrates a flowchart of an approach to configure workflow stages according to some embodiments of the invention.

FIG. 6 illustrates a flowchart of an approach to implement this aspect of some embodiments of the invention. At 602, a workflow model is opened for editing. The workflow model may be either a new model or an existing model. The new and/or existing workflow model is opened to implement the conditional workflow logic.

At 604, one or more stages are selected for configuration. In some embodiments, this action is performed to select an "Approve", "Enrich", or "Commit" stage in the workflow model, where the action is taken to configure the Approve, Enrich, and/or Commit workflow stages to conditionally enter or skip the stage.

The criteria for the stage are configured at 606. In some embodiments, "Property Match" and/or "Validation Failure" are example options to perform the criteria configuration. With regards to property matches, a workflow stage can be conditionally evaluated based on the property values of the request items in the request. With regards to validation failures, a workflow stage can be conditionally evaluated based on the failure of validations for request items in the request.

If "Property Match" is selected, one or more properties are chosen to evaluate as stage criteria for the stage. For each selected property, an Operator (query) and Value (literal) may be selected. One or more properties of request items can be evaluated to conditionally enter or skip a stage for a particular governance request. In addition, one or more properties of request items can be evaluated to conditionally split a request with multiple items into different requests. In some embodiments, some or all of the properties available at the local node level (e.g., version, hierarchy, global node, local node) can be evaluated for conditional workflow purposes. Properties can be evaluated using standard query operators and literal values.

If "Validation Failure" is selected, one or more validations are chosen to run as stage criteria for the stage. In some embodiments, if validations are not selected, all validations for the stage are run as stage criteria. One or more batch validations of request items can be evaluated to conditionally enter or skip a workflow stage for a particular governance request. In addition, one or more batch validations of request items can be evaluated to conditionally split a request with multiple items into different requests. Batch validations available at the local node level can be evaluated for conditional workflow purposes. In some embodiments, validations can be evaluated by checking the validation status (e.g., to check for failure results in entering the stage). Validations to be run for the stage during approval may be run if specific validations are not selected.

At 608, one or more conditional actions are configured for the workflow stage, where the conditional action for the workflow stage is to be performed when stage criteria is met. For certain workflow stage (e.g., Approve/Enrich/Commit stages), an action can be configured to "Enter Stage" to assign the request to users in the stage. For some stages (e.g., Approve/Enrich stages), an action can be configured to "Split" the request to move request items into a new request which will be assigned to users in the stage. Actions can be configured to conditionally assign a request to stage users when stage criteria is met (e.g., for the Approve, Enrich, or Commit stage types). In addition, certain stage types (e.g., Approve or Enrich stage type) can be configured to conditionally split request items in a different request which is assigned to stage users when criteria is met.

At 610, the stage criteria changes can be saved. In some embodiments, the user can persist changes to conditional workflow metadata to a repository (e.g., DRM or "data relationship management" repository). In certain configurations, changes to conditional workflow metadata can take immediate effect for any new or in-flight request in the application.

If any request items meet the stage criteria for a workflow stage using the "Enter Stage" conditional action, the request enters the stage and workflow processing (such as assigning the request to approving users) continues for that stage.

Figure 7:
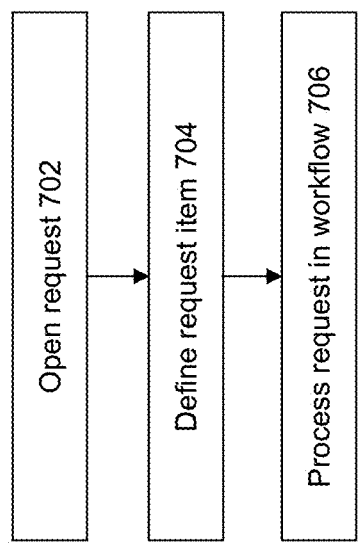
FIG. 7 shows a flowchart of an approach to implement processing in some embodiments for the "Enter Stage" conditional action.

FIG. 7 shows a flowchart of an approach to implement processing in some embodiments for the "Enter Stage" conditional action. At 702, an editable request is opened using a workflow model with stage criteria configured for a stage and the conditional action set to "Enter Stage". The editable request may be opened, for example, from a web client to the system. The stage criteria can be evaluated for request items of a submitted request in any previous workflow stage where the request was editable.

At 704, the process is used to define a request item which will meet stage criteria for the stage. A workflow action is selected (e.g., Submit or Approve) to move the request to the stage with stage criteria. The "Property Match" and/or "Validation Failure" stage criteria can be evaluated for request items added in a previous workflow stage.

At 706, the request enters the workflow stage and the system performs the appropriate actions for that stage. A workflow stage can be entered for a request based on stage criteria defined for the stage in the workflow model. When stage criteria have been met for a request item, the request will enter the workflow stage.

If any request items meet the stage criteria for a workflow stage using the "Split" conditional, this action will be moved into a separate submitted request using the same workflow model and that request will be enter the workflow stage. If all request items meet stage criteria, the original request will enter the stage and no split will be performed. Items not meeting the criteria will remain in the original request and the stage will be skipped for the original request. After the split is completed, the original request and the new split request act as fully functioning, independent requests.

Figure 8:
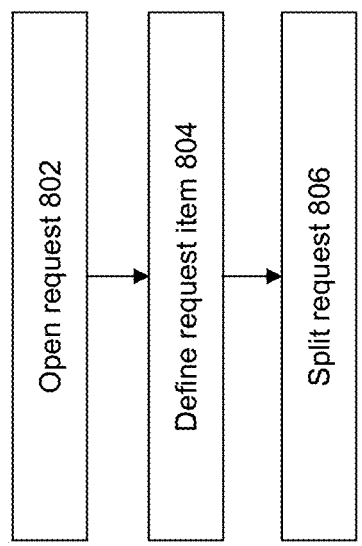
FIG. 8 shows a flowchart of an approach to implement processing in some embodiments for the "Split" conditional action.

FIG. 8 shows a flowchart of an approach to implement processing in some embodiments for the "Split" conditional action. At 802, an existing request is opened using a workflow model with stage criteria configured for a stage and the conditional action set to "Split Request". The editable request may be opened, for example, from a web client to the system. Stage criteria can be evaluated for request items of a submitted request in any previous workflow stage where the request was editable.

At 804, a request item is defined which will meet stage criteria for the stage and another request item which will not. A workflow action is selected (e.g., Submit or Approve) to advance the request to the stage with criteria configured. The "Property Match" and/or "Validation Failure" stage criteria can be evaluated for request items added in a previous workflow stage when the request is advanced to the stage where the criteria is configured.

At 806, split action is performed. The request item which meets stage criteria is moved to a new submitted request and the new request enters the stage. The original request containing the request item which did not meet stage criteria will skip the stage. Request items meeting stage criteria can be split (moved) into a new submitted request which will enter the stage. Request items not meeting stage criteria can remain in the original request and skip the stage. Various information from the original request can be copied into the split request (e.g., static request header properties, workflow tags, comments, participants, and request activity). In some embodiments, users of requests created during a Split operation will have visibility to certain information from the original request at the time the request was split, including for example, a request title; workflow model; request age; submit user; submit date; request items which met stage criteria; workflow tags; comments; participants; and/or request activity. In some embodiments, a Split activity will be recorded for a request which was created due a Split action being performed for a workflow stage based on stage criteria. In addition, the Split activity can be configured to identify the request items which were moved to the split request.

Figure 9:
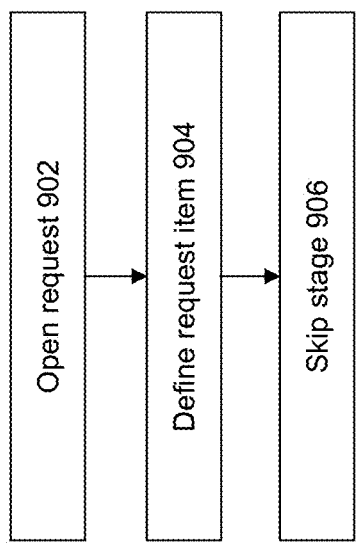
FIG. 9 shows a flowchart of an approach to implement processing in some embodiments for the "Skip" action.

If request items in a request do not meet stage criteria, the system skips the stage. The workflow path for the request marks skipped stages with a Skipped indicator. FIG. 9 shows a flowchart of an approach to implement processing in some embodiments for the "Skip" action. At 902, an existing request is opened using a workflow model with stage criteria configured for the stage. The editable request may be opened, for example, from a web client to the system. Stage criteria can be evaluated for request items of a submitted request in any previous workflow stage where the request was editable.

At 904, a request item is defined which does not meet stage criteria for the stage. A workflow action is selected (e.g., Submit or Approve) to move the request to the stage with stage criteria. The Property Match and Validation Failure stage criteria can be evaluated for request items added in a previous workflow stage.

At 906, the workflow stage is skipped for the request and the request proceeds to the next stage in the workflow path. A workflow stage can be skipped for a request based on stage criteria defined for the stage in the workflow model. The request will automatically advance to the next workflow stage in the workflow model, and the workflow path will indicate that the stage was skipped. No participants will be recorded for a workflow stage which was skipped as a result of not meeting stage criteria. A Skipped activity will be recorded for a request which has not met stage criteria for a stage and the stage was skipped for that request.

When a split request is being pushed back, the originating stage for each request item is evaluated and the earliest stage for all items is determined. The request can be pushed back as far as that stage and not any earlier stage in the workflow path. After pushback, the request will proceed through the re-approval process. The processing in some embodiments operates by first opening open an assigned request which was created during a Split action (e.g., for an Approve/Enrich stage). A user can push back an assigned request which has already passed a workflow stage where request items were split into separate requests to follow different workflow paths. Next, the request can be claimed, and then pushed back, where previous workflow stages applicable to the request items in the split request are available for pushback. In some embodiments, split requests can be pushed back to the earliest stage where at least one request item in the request existed when that stage was completed.

When a request is being pushed back to a stage with stage criteria, the stage criteria is re-evaluated for the pushback stage. If the stage criteria are met by any request item, the request is pushed back to the stage. If stage criteria are not met, the request is not pushed back to that stage.

Figure 10:
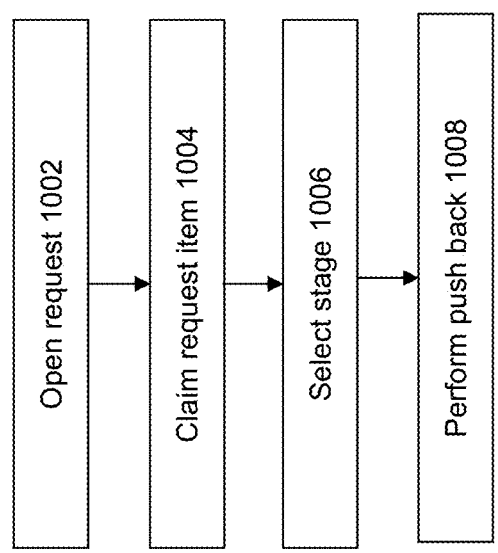
FIG. 10 shows a flowchart of an approach to implement processing in some embodiments for the re-approval action.

After pushback, the request will proceed through a re-approval process. If another stage with stage criteria is encountered during re-approval, the stage criteria will be re-evaluated for that stage and the appropriate action (e.g., enter/skip stage or split request) will be performed. FIG. 10 shows a flowchart of an approach to implement processing in some embodiments for the re-approval action. At 1002, an assigned request is opened which has already passed a workflow stage configured with stage criteria. The request may be opened, for example, from a web client to the system. A user can push back an assigned request which has already passed a workflow stage configured with stage criteria, which may be regardless of the outcome for that stage in some embodiments.

At 1004, the claim will be requested. Once the request is claimed, a pushback will be performed where previous workflow stages are available for selection. At 1006, selection will occur of the stage with stage criteria. In some embodiments, previous workflow stages in a workflow model are available for the push back. In addition, a request can be pushed back to a workflow stage configured with stage criteria.

If any request items meet stage criteria for the stage, then at 1008, the request will be successfully pushed back to the stage. The "Property Match" and "Validation Failure" stage criteria can be evaluated for request items in a request which is pushed back to a stage where criteria is configured. When stage criteria are met for a request item, the request will be pushed back. A split request created during a conditional workflow stage can be pushed back to a previous stage in the workflow model.

It is noted that if the request does not meet stage criteria for the stage, the request will not be pushed back to the stage. When stage criteria are not met for any request item, the request will not be pushed back to the stage where the criteria are configured.

The request can be opened in the stage prior to a stage with stage criteria, where the request is advanced to the stage with stage criteria as part of the re-approval process. Pushed back requests which enter a stage as a result of meeting criteria configured for the push back stage behave as they normally would in a push back scenario.

From a user interface perspective, if any request items meet the stage criteria for the next stage, the request enters the stage or the request items are split into a new request which enters the stage. Otherwise, the stage is marked as skipped in the workflow path. The workflow path can indicate whether the stage was entered or skipped for both original and split requests.

Figure 11:
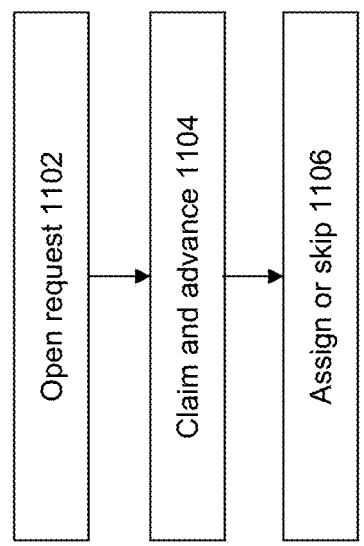
FIG. 11 shows a flowchart of an approach to implement processing to handle Commit stages according to some embodiments.

Commit stages can be configured with stage criteria in the situation where users in that stage only need to be involved if the request items meet specific criteria (such as certain property values or validation failures). Otherwise, the commit stage approval can be skipped and the request can be committed to the target version if it passes validations for the Commit stage. FIG. 11 shows a flowchart of an approach to implement this processing in some embodiments. At 1102, assigned request is opened in a workflow stage prior to the commit stage. The editable request may be opened, for example, from a web client to the system.

At 1104, the request is claimed, and the request then advances to the commit stage. The stage criteria are then evaluated for the stage. The Property Match and Validation Failure stage criteria can be evaluated for request items in a commit stage configured with the criteria.

At 1106, if the request meets stage criteria for the stage, then the request will be assigned to users configured for the stage. On the other hand, if the request does not meet stage criteria for the stage, the commit stage is skipped and the request is committed to the target version if it passes all validations run for the commit stage. The request status is then changed to "Committed". A request which does not meet stage criteria for a Commit stage will be automatically validated and if valid, will be committed to the target version FIG. 12A provides an illustration of an example interface 1202 that may be used to configure workflows in some embodiments of the invention. The interface 1202 is used to create and configure a workflow model 1204 for a business process workflow. The workflow model 1204 is used to control user tasks, stages of workflow, and/or types of data involved to govern a set of changes to data in the management system. Within the workflow, workflow requests are used to initiate changes or corrections to be completed, approved, enriched, and committed by other users using governance workflows. The governance worklist is a central location for interacting with change and remediation requests. From the worklist, governance users may submit change requests or review and participate in requests assigned to their user group. The interface 1202 may include control elements to control and configure workflow labels, stages, tasks, node access, workflow methods, re-approvals, notifications, and/or actions.

The workflow model 1204 may include one or more workflows that are configurable to include one or more specific stages 1208 in the workflow. For example, in a data governance system, the stages may include "Initial Approval", "Final Approval", and "Request" stages. The interface 1202 may also be used to configure one or more workflow tasks 1210 to be performed for some or all of the stages. For example, for a workflow to request approval for a new product for a business, the "Initial Approval" stage may include a specific task to obtain approval from the manager of the department that pertains to the proposed new product.

The workflow model 1204 may include information about workflow node hierarchy groups. Hierarchy data/constraints can be used to limit the hierarchies and nodes available for viewing and selection when updating a node data type property value. A hierarchy constraint is an optional configuration for property definitions that use a node data type. The hierarchy constraint feature uses hierarchy groups and hierarchy group properties, which can be configured to assign hierarchy constraints. A hierarchy group allows related hierarchies to be organized together for browsing and selection.

The workflow model 1204 may also include one or more model filters 1206. These filters 1206 can be used to filter properties in the system. For example, the filters can be used to specify which hierarchies or hierarchical portions can be modified by the workflow. As another example, filtering may be applied to restrict the workflow to only "current" products, "planned/future" products, or a combination of both types of products.

Figure 12B:
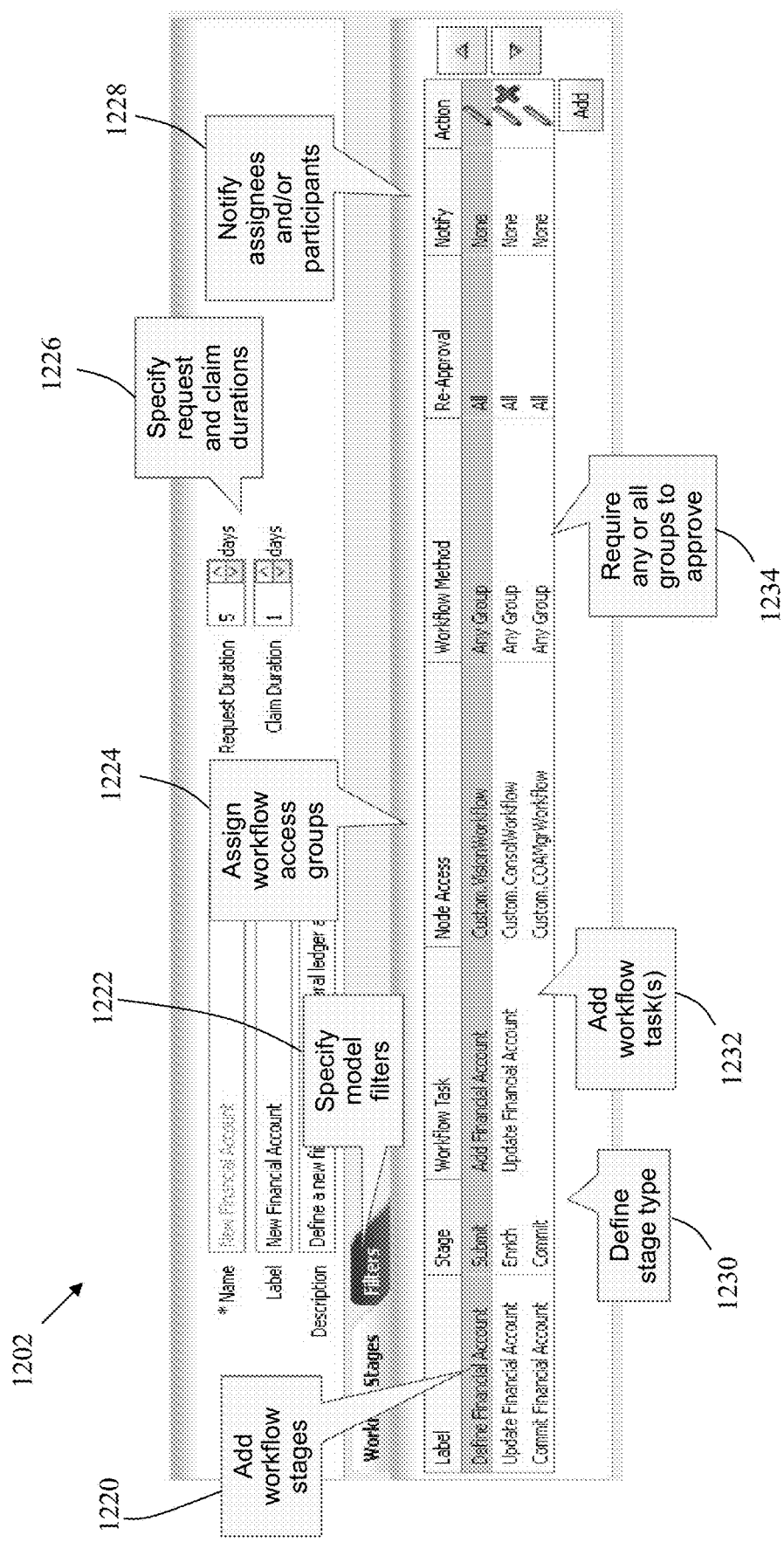

FIG. 12B shows an example approach to use the example interface 1202 to configure/structure a governance process (e.g., for a change or remediation request) into an ordered set of workflow stages for approval, enrichment, and commitment. This figure illustrates which workflow stages control which users can participate when, which actions and tasks they can perform, and who is notified of their activity.

Here, interface portion 1220 is configurable to add workflow stages. Interface portion 1222 is configurable to specify one or more model filters. Interface portion 1224 is configurable to assign workflow access groups. Interface portion 1226 is configurable to specify request and claim durations. Interface portion 1228 is configurable to notify assignees and/or participants. Interface portion 1230 is configurable to define stage types. Interface portion 1232 is configurable to add workflow tasks. Interface portion 1234 is configurable to set groups for approval.

Figure 12C:
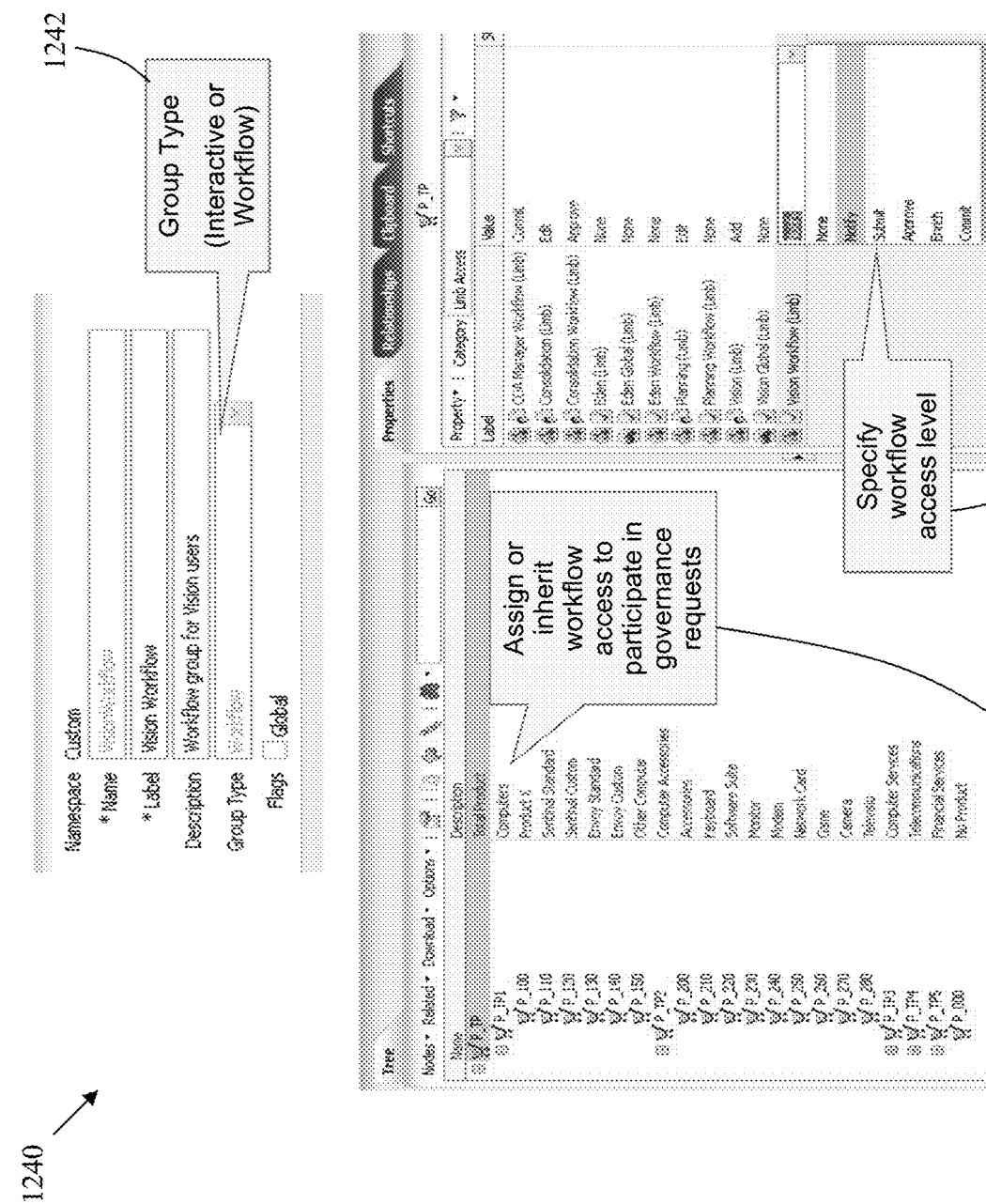

FIG. 12C shows an example of an interface 1240 to configure workflow node access groups. This figure shows how users can be assigned workflow access to data using node access groups. In one embodiment users participate in workflow stages for requests: (1) which include request item nodes with an access level equal to stage type or greater; and/or (2) are controlled by stage type and workflow task configuration. Interface portion 1242 is configurable to set group types. Interface portion 1244 is configurable to assign or inherit workflow access to participate in governance requests. Interface portion 1246 is configurable to specify workflow access levels.

Figure 13:
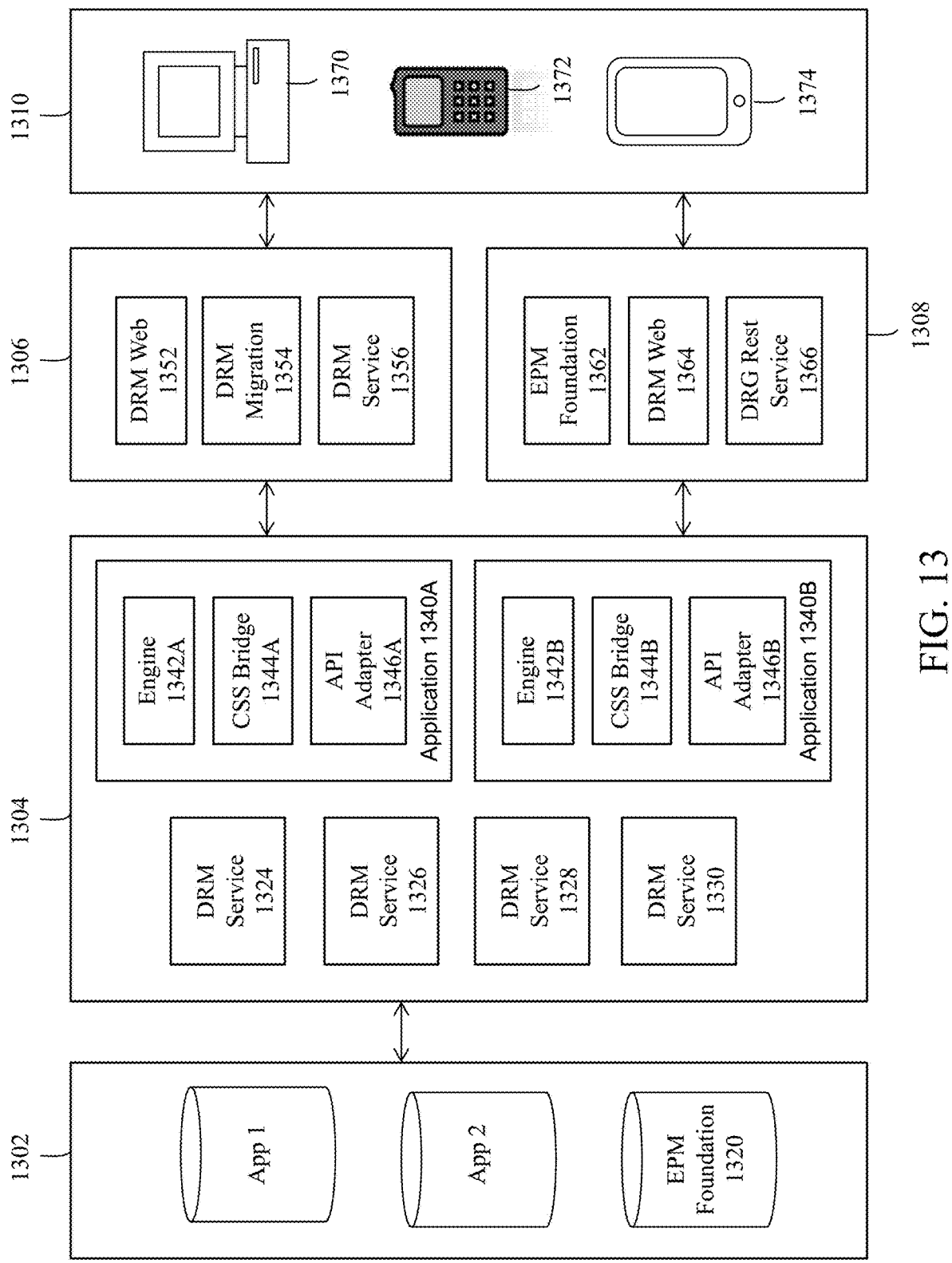
FIG. 13 illustrates a block diagram of an illustrative computing system suitable for implementing some embodiments of the present invention.

FIG. 13 illustrates an example system to implement business workflow in a data relationship management (DRM) architecture 1300 according to some embodiments of the invention. The architecture 1300 includes several backend database servers 1302. Examples of such database servers 1302 include the Oracle RDBMS (relational database management system) application. These database servers provide backend database services/foundation for various applications. For example, an EPM (Enterprise Performance Management) foundation 1320 is implemented using a backend database server.

A DRM application server 1304 is provided within architecture 1300. The DRM application server 1304 supports one or more applications, including applications 1340A and 1340B. Each application includes a processing engine 1342A-B, CSS (cascading style sheets) bridge 1344A-B, and API (applications programming interface) adapter 1346A-B. The processing engine performs DRM processing, such as the workflow processing described above. The CSS bridge provides support for themes and element definitions within style sheets in the application. The API adapter provides an interface for API calls.

The DRM application server 1304 also includes a DRM service 1324, DRM console 1326, batch client 1328, and EPM foundation 1330. The DRM service 1324 provides DRM-related services within the application server 1304. The DRM console 136 implements an administrative interface for the application server 1304. The batch client 1328 implements batching services to handle grouped-together tasks on a batch basis. The EPM foundation 1330 provides basic EPM data access/storage functions within the application server 1304.

A DRM web server 1306 is provided in the architecture 1300 to interface with the application server 1304. DRM web services 1352 implements a Data Relationship Management Web Service Application Programming Interface (API) as the public interface for remotely interacting with the DRM application server 1304. The web service is, for example, a SOAP-based web service that can be used for product integration or to develop custom Data Relationship Management applications or clients. To facilitate product integration, a DRM migration tool 1354 can be provided for data migration tasks. DRM services 1356 are provided to implement DRM processing. In some embodiments, the DRM web service is implemented in Java and is deployed to an Oracle WebLogic Application Server as a J2EE Web Application. The web service communicates with the DRM server via the API adapter 1346. The DRM web service uses the Oracle Web Services Manager (OWSM) for policy management and security of service infrastructure.

In addition, a middleware server 1308 (such as the Oracle Fusion Middleware product) can be provided in architecture 1300. The middleware server 1308 may include an EPM foundation 1362, DRM web services 1364, and Rest services 1366.

Clients 1310 may be implemented on any suitable user platform. For example, client access may be provided using a user station 1370, mobile device 1372, or a tablet device 1374. The clients interface with the middleware server 1308 and/or web server 1306 to access the application server 1304.

Any suitable communications protocols may be employed to communicate between the components in architecture 1300. For example, TCP/IP may be employed to communicate between the backend database server 1302 and the application server 1304. Net.tcp may be employed to communicate between the application server 1304 and the web server 1306. Http/s may be used to communication between the middleware server 1308 and the application server 1304. Similarly, Http/s may be used to communicate to the client devices 1310.

In some embodiments, the architecture 1300 is implemented to include a single engine and application server per application—where there is a single application server per DRM application. However, multiple web servers are provided, e.g., for load balancing and scalability purposes. In this way, the application server does not need to be installed with the web server component. During startup, the application therefore loads only a single engine. The version to be loaded from the database only needs to be loaded once. The CSS bridge can also be installed on a separate machine from the application server. A single API adapter can be used on the application server only.

This approach provides numerous advantages, such as for example, optimization for multi-processor single machine deployments, eliminates/minimizes event traffic between engines/servers, and reduces DB connections and volumes of data to be transferred. In effect, this type of architecture can greatly improve concurrency for parallel read operations. High concurrency can be provided for the system processing, particularly for read operations—providing higher utilization of the available processors. In some embodiments, all read operations are non-blocking and longer reads are run immediately.

Therefore, what has been described is an improved method, system, and computer program product for implementing adaptive business workflows, where the context is coordinated with a hierarchy. The contextual workflow may include conditional stages that are also coordinated with the hierarchy.

Data governance processes require different workflows and approvals depending upon the type of change being requested and the context of the data that is being changed. Current data governance systems require that different workflow models be explicitly defined for each data context. In contrast, the embodiments of the present invention provide an adaptive/conditional data governance system, where the execution of stages and approvals in a workflow is contextually based upon the data being changed and where the data resides in a multi-structure hierarchy model. The stages and approvals of a data governance workflow are derived based upon how the requested changes align with the multiple hierarchies affected by these changes. This invention greatly reduces the amount of effort required to maintain the various workflows needed to support data governance by allowing a single adaptive workflow model to support multiple data contexts.

This approach permits the system to account for governance processes that constantly require change to meet changing business requirements. The invention's ability to automatically change based on reorganized reporting hierarchies means a much lower cost of ownership, many times requiring no reconfiguration of the defined governance flows. Even when those flows do require logic changes, the fact that the invention is 100% configuration-based (as opposed to alternatives that require Java developers to author code), lowers the total cost of ownership, accelerates time to value, lowers the bar in terms of skill sets from developer to administrator, improves transparency, agility, and enables regulatory compliance peace-of-mind.

System Architecture Overview

Figure 14:
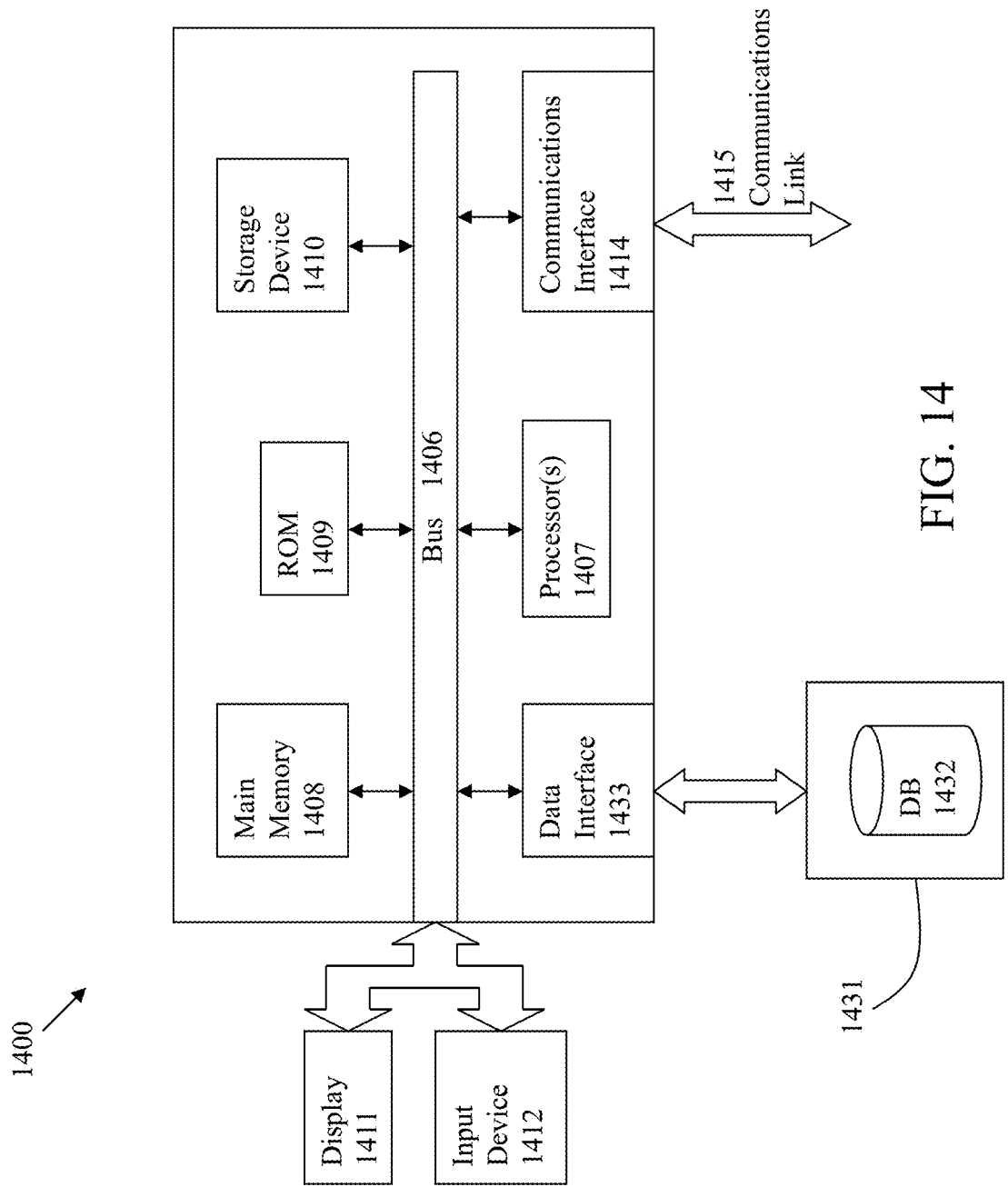
FIG. 14 shows an architecture of an example computing system with which the invention may be implemented.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method implemented with a processor, comprising:
identifying a workflow to process for a request comprising a first item and a second item at a first system based on one or more inputs received from a user device as a result of a user input;
determining multiple workflow stages for the workflow with at least a hierarchy model based in part or in whole upon a location of data that is to be changed in the hierarchy model by an execution of the workflow, the workflow comprising the multiple workflow stages and being represented by corresponding workflow data in a first database on a first storage device, the first database including a plurality of workflows, the workflow of the plurality of workflows utilizing contextual information that comprises the location of the data to be changed in the hierarchy model, the first item and the second item in the request corresponds to the data that is to be changed in the hierarchy model, and the multiple workflow stages being linked with each other and further linking database objects in the first database on the first storage device;

determining that a workflow stage of the multiple workflow stages is dependent on a hierarchy at a second system by using at least the hierarchy model, the hierarchy being represented by the hierarchy model in a second database on a second storage device different from the first storage device, the workflow stage being dependent on the hierarchy when a database object in the first database referentially links to the hierarchy model on the second database, the hierarchy model having a plurality of nodes that is represented by a plurality of database table entries of the second database, wherein one or more columns of the second database store relationship data of the plurality of nodes and parameter information for the plurality of nodes, and the hierarchy model comprising organizational data that maps relationships among organization resources;

accessing the hierarchy on the second database referenced by the workflow stage in the first database;

determining whether the request comprising the first item and the second item has passed the workflow stage, wherein the first item and the second item in the request correspond to the data that is to be changed in the hierarchy model by the execution of the workflow;

when the request is determined to have passed the workflow stage, determining multiple prior workflow stages that precede the workflow stage at least by evaluating the multiple prior workflow stages with respect to the first item and the second item;

pushing the request back to a prior workflow stage of the multiple prior workflow stages;

determining whether the request entering the workflow stage is to be split based in part or in whole upon a stage criterion for the workflow stage;

splitting the request when the request is determined to be split at least by:

maintaining the first item that does not satisfy the stage criterion for the workflow stage in the request;

generating a new request, which is separate from the request, for the second item that satisfies the stage criterion for the workflow stage;

processing the request with a same workflow model for the workflow; and processing the new request at the workflow stage with the same workflow model; and processing the workflow stage using the hierarchy and the hierarchy model based at least in part upon whether the request is to be split at least by:

traversing the hierarchy to identify a hierarchy location in the hierarchy corresponding to the contextual information of the workflow; and determining at least one task of one or more tasks to be executed for the workflow stage based at least in part upon the hierarchy location in the hierarchy, wherein the workflow adaptively executes the at least one task of the one or more tasks by referencing a portion of the hierarchy model based in part or in whole on at least the contextual information, the workflow automatically integrates changes to the hierarchy model when the changes comprise a modification to the relationships among the organization resources, and the contextual information identifies one organization resource of the organization resources supported by the workflow.

2. The method of claim 1, wherein the workflow comprises a conditional stage, and the conditional stage comprises conditional logic that is analyzed using contents of the hierarchy.

3. The method of claim 1, wherein a single workflow corresponds to multiple organizational structures.

4. The method of claim 1, wherein filtering is applied to the workflow.

5. The method of claim 1, wherein database objects in one or more first nodes in the hierarchy inherit one or more attributes from one or more other nodes in the hierarchy.

6. The method of claim 1, wherein the hierarchy is changed by processing of the workflow, and when an earlier stage of the workflow modifies the hierarchy, a later stage of the workflow accesses a modified version of the hierarchy.

7. The method of claim 1, wherein the hierarchy on the second database is accessed by a first application on the first system using one or more application programming interface (API) calls, the first database on the first storage device and the second database in the second storage device being maintained at a backend database server, the first system for the first storage device and the second system for the second storage device being implemented as part of an application server, and the hierarchy being maintained by a second application at the second system; and the method further comprising interfacing, by the user device, with the application server over a middleware server between the user device and the application server, the middleware server implementing at least a hypertext transport protocol to enable communication with the user device.

8. A non-transitory computer readable medium having stored thereon a sequence of instructions which, when executed by a processor, causes the processor to execute a set of acts, the set of acts comprising:

identifying a workflow to process for a request comprising a first item and a second item at a first system based on one or more inputs received from a user device as a result of a user input;

determining multiple workflow stages for the workflow with at least a hierarchy model based in part or in whole upon a location of data that is to be changed in the hierarchy model by an execution of the workflow, the workflow comprising the multiple workflow stages and being represented by corresponding workflow data in a first database on a first storage device, the first database including a plurality of workflows, the workflow of the plurality of workflows utilizing contextual information that comprises the location of the data to be changed in the hierarchy model, the first item and the second item in the request corresponds to the data that is to be changed in the hierarchy model, and the multiple workflow comprising stages being linked with each other and further linking database objects in the first database on the first storage device;

determining that a workflow stage of the multiple workflow stages is dependent on a hierarchy at a second system by using at least the hierarchy model, the hierarchy being represented by the hierarchy model in a second database on a second storage device different from the first storage device, the workflow stage being dependent on the hierarchy when a database object in the first database referentially links to the hierarchy model on the second database, the hierarchy model having a plurality of nodes that is represented by a plurality of database table entries of the second database, wherein one or more columns of the second database store relationship data of the plurality of nodes and parameter information for the plurality of nodes, and the hierarchy model comprising organizational data that map relationships among organization resources;

accessing the hierarchy on the second database referenced by the workflow stage in the first database; and determining whether the request comprising the first item and the second item has passed the workflow stage, wherein the first item and the second item in the request correspond to the data that is to be changed in the hierarchy model by the execution of the workflow;

when the request is determined to have passed the workflow stage, determining multiple prior workflow stages that precede the workflow stage at least by evaluating the multiple prior workflow stages with respect to the first item and the second item;

pushing the request back to a prior workflow stage of the multiple prior workflow stages;

determining whether the request entering the workflow stage is to be split based in part or in whole upon a stage criterion for the workflow stage;

splitting the request when the request is determined to be split at least by:

maintaining the first item that does not satisfy the stage criterion for the workflow stage in the request;

generating a new request, which is separate from the request, for the second item that satisfies the stage criterion for the workflow stage;

processing the request with a same workflow model for the workflow; and processing the new request at the workflow stage with the same workflow model; and processing the workflow stage using the hierarchy and the hierarchy model based at least in part upon whether the request is to be split at least by:

traversing the hierarchy to identify a hierarchy location in the hierarchy corresponding to the contextual information of the workflow; and determining at least one task of one or more tasks to be executed for the workflow stage based at least in part upon the hierarchy location in the hierarchy, wherein the workflow adaptively executes at least one task of the one or more tasks by referencing a portion of the hierarchy model based in part or in whole on at least the contextual information, the workflow automatically integrates changes to the hierarchy model when the changes comprise a modification to the relationships among the organization resources, and the contextual information identifies one organization resource of the organization resources supported by the workflow.

9. The computer readable medium of claim 8, wherein the workflow comprises a conditional stage, and the conditional stage comprises conditional logic that is analyzed using contents of the hierarchy.

10. The computer readable medium of claim 8, wherein a single workflow corresponds to multiple organizational structures.

11. The computer readable medium of claim 8, wherein filtering is applied to the workflow.

12. The computer readable medium of claim 8, wherein database objects in one or more first nodes in the hierarchy inherit one or more attributes from one or more other nodes in the hierarchy.

13. The computer readable medium of claim 8, wherein the hierarchy is changed by processing of the workflow and when an earlier stage of the workflow modifies the hierarchy, a later stage of the workflow accesses a modified version of the hierarchy.

14. The computer readable medium of claim 8, wherein the hierarchy on the second database is accessed by a first application on the first system using one or more application programming interface (API) calls, the first database on the first storage device and the second database in the second storage device being maintained at backend database server, the first system for the first storage device and the second system for the second storage device being implemented as part of an application server, and the hierarchy being maintained by a second application at the second system; and the set of acts further comprising interfacing, by the user device by, with the application server over a middleware server between the user device and the application server, the middleware server implementing at least a hypertext transport protocol to enable communication with the user device.

15. A system, comprising:

a memory having stored thereon a sequence of instructions; and a processor, wherein the process is capable of executing the sequence of instructions which executes a set of acts, the set of acts comprising:

identifying a workflow to process for a request comprising a first item and a second item at a first system based on one or more inputs received from a user device as a result of a user input;

determining multiple workflow stages for the workflow with at least a hierarchy model based in part or in whole upon a location of data that is to be changed in the hierarchy model by an execution of the workflow, the workflow comprising the multiple workflow stages and being represented by corresponding workflow data in a first database on a first storage device, the first database including a plurality of workflows, the workflow of the plurality of workflows utilizing contextual information that comprises the location of the data to be changed in the hierarchy model, the first item and the second item in the request corresponds to the data that is to be changed in the hierarchy model, and the multiple workflow comprising stages being linked with each other and further linking database objects in the first database on the first storage device;

determining that a workflow stage of the multiple workflow stages is dependent on a hierarchy at a second system by using at least the hierarchy model, the hierarchy being represented by the hierarchy model in a second database on a second storage device different from the first storage device, the workflow stage being dependent on the hierarchy when a database object in the first database referentially links to the hierarchy model on the second database, the hierarchy model having a plurality of nodes that is represented by a plurality of database table entries of the second database, wherein one or more columns of the second database store relationship data of the plurality of nodes and parameter information for the plurality of nodes, and the hierarchy model comprising organizational data that maps relationships among organization resources;

accessing the hierarchy on the second database referenced by the workflow stage in the first database;

determining whether the request comprising the first item and the second item has passed the workflow stage, wherein the first item and the second item in the request correspond to the data that is to be changed in the hierarchy model by the execution of the workflow;

when the request is determined to have passed the workflow stage, determining multiple prior workflow stages that precede the workflow stage at least by evaluating the multiple prior workflow stages with respect to the first item and the second item;

pushing the request back to a prior workflow stage of the multiple prior workflow stages;

determining whether the request entering the workflow stage is to be split based in part or in whole upon a stage criterion for the workflow stage;

splitting the request when the request is determined to be split at least by:
  maintaining the first item that does not satisfy the stage criterion for the workflow stage in the request;
  generating a new request, which is separate from the request, for the second item that satisfies the stage criterion for the workflow stage;
  processing the request with a same workflow model for the workflow; and
  processing the new request at the workflow stage with the same workflow model; and processing the workflow stage using the hierarchy and the hierarchy model based at least in part upon whether the request is to be split at least by:

traversing the hierarchy to identify a hierarchy location in the hierarchy corresponding to the context of the workflow; and determining at least one task of one or more tasks to be executed for the workflow stage based at least in part upon the hierarchy location in the hierarchy, wherein
  the workflow adaptively executes the at least one task of the one or more tasks by referencing a portion of the hierarchy model based in part or in whole on at least the contextual information,
  the workflow automatically integrates changes to the hierarchy model when the changes comprise a modification to the relationships among the organization resources, and
  the contextual information identifies one organization resource of the organization resources supported by the workflow.

16. The system of claim 15, wherein the workflow comprises a conditional stage, and the conditional stage comprises conditional logic that is analyzed using contents of the hierarchy.

17. The system of claim 15, wherein a single workflow corresponds to multiple organizational structures.

18. The system of claim 15, wherein filtering is applied to the workflow.

19. The system of claim 15, wherein database objects in one or more first nodes in the hierarchy inherit one or more attributes from one or more other nodes in the hierarchy.

20. The system of claim 15, wherein the hierarchy is changed by processing of the workflow and when an earlier stage of the workflow modifies the hierarchy, a later stage of the workflow accesses a modified version of the hierarchy.

21. The system of claim 15,
wherein the hierarchy on the second database is accessed by a first application on the first system using one or more application programming interface (API) calls, the first database on the first storage device and the second database in the second storage device being maintained at backend database server, the first system for the first storage device and the second system for the second storage device being implemented as part of an application server, and the hierarchy being maintained by a second application at the second system; and the set of acts further comprising, interfacing, by the user device by, with the application server over a middleware server between the user device and the application server, the middleware server implementing at least a hypertext transport protocol to enable communication with the user device.

* * * * *

UNITED STATES PATENT AND TRADEMARK OFFICE
CERTIFICATE OF CORRECTION

PATENT NO. : 10,636,005 B2
APPLICATION NO. : 14/862883
DATED : April 28, 2020
INVENTOR(S) : Kamath et al.

It is certified that error appears in the above-identified patent and that said Letters Patent is hereby corrected as shown below:

In the Specification

In Column 14, Line 34, delete "version" and insert -- version. --, therefor.

In the Claims

In Column 22, Line 39, in Claim 14, delete "device by," and insert -- device, --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*